United States Patent
Tiffen et al.

(10) Patent No.: US 6,820,844 B2
(45) Date of Patent: Nov. 23, 2004

(54) TRIPOD HANDLE ARRANGEMENT

(75) Inventors: Ira Tiffen, Pt. Washington, NY (US); Leigh E. Boden, Coram, NY (US)

(73) Assignee: The Tiffen Company LLC, Hauppauge, NY (US)

( * ) Notice: Subject to any disclaimer, the term of this patent is extended or adjusted under 35 U.S.C. 154(b) by 9 days.

(21) Appl. No.: 10/359,358

(22) Filed: Feb. 6, 2003

(65) Prior Publication Data

US 2004/0155159 A1 Aug. 12, 2004

(51) Int. Cl.⁷ .......................... F16M 11/04; F16M 11/16
(52) U.S. Cl. ................. 248/168; 248/177.1; 248/187.1
(58) Field of Search ................................. 248/166, 168, 248/169, 177.1, 178.1, 179.1, 180.1, 181.1, 181.2, 183.1, 183.2, 186.1, 186.2, 187.1

(56) References Cited

U.S. PATENT DOCUMENTS

| 3,598,512 | A | * | 8/1971 | Johnson | 431/343 |
| 3,632,073 | A | * | 1/1972 | Nakatani | 248/169 |
| 4,407,182 | A | * | 10/1983 | Biasini | 84/453 |
| 5,400,234 | A | * | 3/1995 | Yu | 362/396 |
| 5,682,915 | A | * | 11/1997 | Martin | 135/20.1 |
| 5,839,704 | A | * | 11/1998 | Appleman | 248/178.1 |
| 6,254,044 | B1 | * | 7/2001 | Lee | 248/177.1 |
| 6,332,284 | B1 | * | 12/2001 | Tafforeau | 40/603 |

FOREIGN PATENT DOCUMENTS

NO 62266 B1 * 4/1940 ................. 248/169

* cited by examiner

Primary Examiner—Jonathon A. Szumny
(74) Attorney, Agent, or Firm—Kirschstein et al.

(57) ABSTRACT

A miniature tripod is mounted in a hollow handle of a main tripod for joint use therewith for increased versatility, as well as for removal therefrom for individual use.

12 Claims, 3 Drawing Sheets

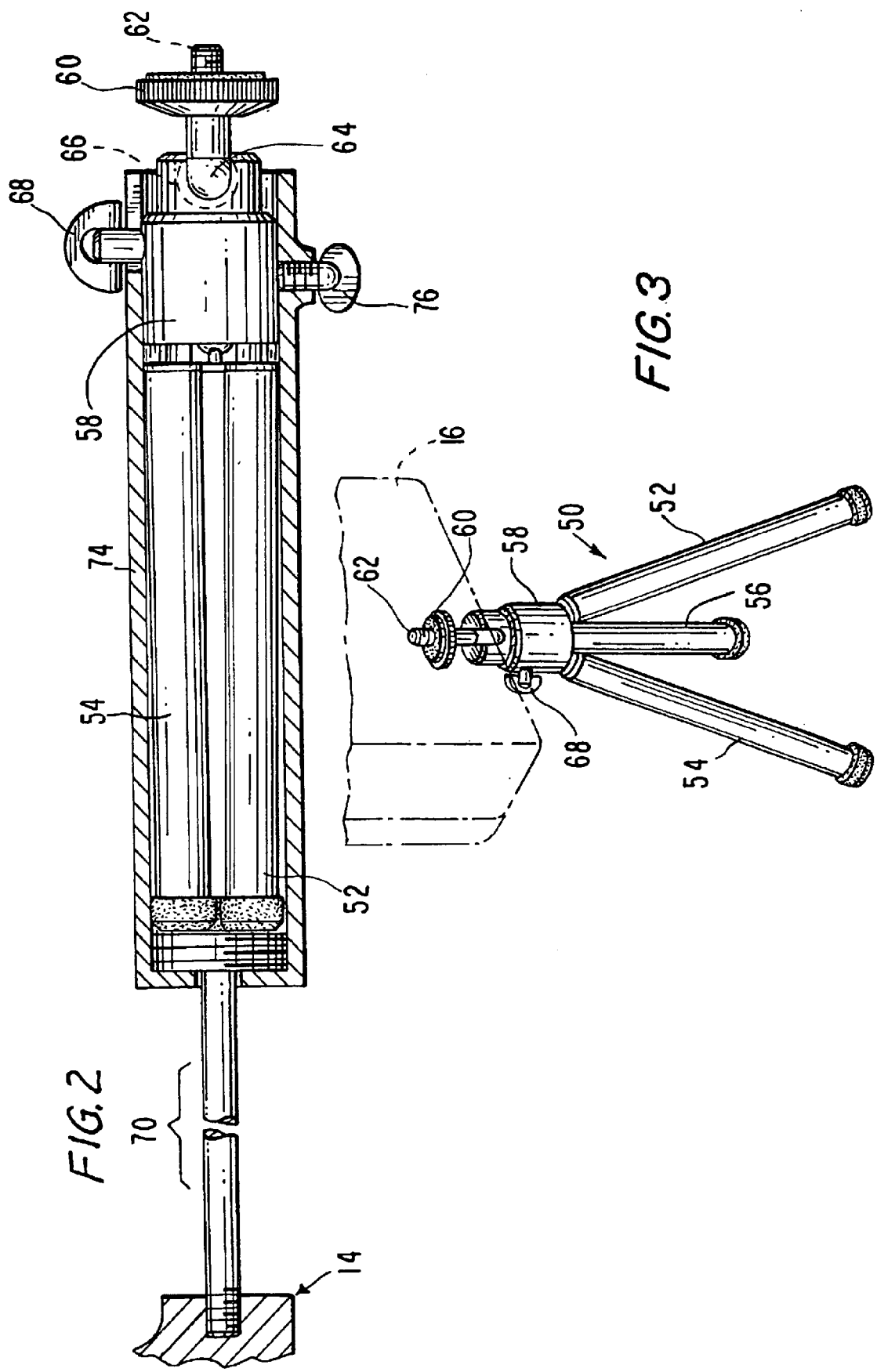

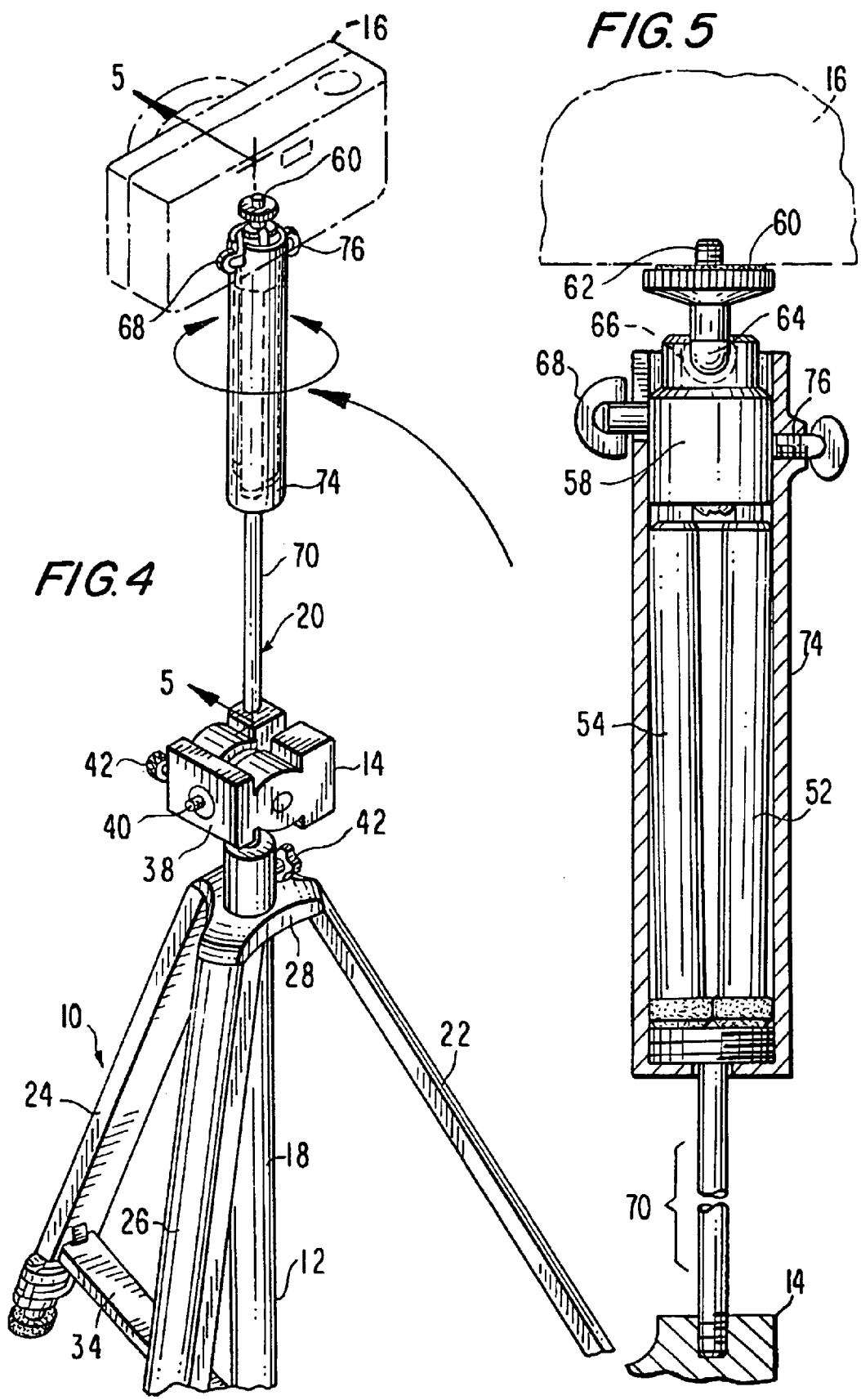

TRIPOD HANDLE ARRANGEMENT

BACKGROUND OF THE INVENTION

1. Field of the Invention

The present invention generally relates to a main tripod for supporting equipment and, more particularly, to a tripod handle for storing an auxiliary tripod for individual use separate from the main tripod, or for holding the auxiliary tripod for joint use with the main tripod.

2. Description of the Related Art

It is known to use a tripod to hold photographic equipment, such as a camera or binoculars, in a steady position. A non-moving camera is essential for taking a clear, well-defined picture. The tripod comes in a variety of sizes, one of which is miniature and known in the trade as a minipod or a table-top tripod. Virtually all tripods have a set of legs that are movable between a closed or collapsed position in which the legs are adjacent one another for convenient storage and handling, and an open or deployed position in which the legs are spread apart and splayed to form a stable, non-moving support.

A photographer typically carries a host of equipment and accessories to deal with the vagaries of picture taking. Such accessories may include full size and miniature tripods, the latter being easily misplaced due to their small size. Camera bags and clothing pockets are available for holding small accessories, but have proven to be unsatisfactory in practice.

SUMMARY OF THE INVENTION

OBJECTS OF THE INVENTION

One object of this invention is to store a minipod within a full size tripod or analogous camera support for convenient handling and access.

Another object of this invention is to resist misplacing and loss of the minipod.

Still another object of this invention is to increase the versatility of the full size tripod by using it together with the minipod.

FEATURES OF THE INVENTION

In keeping with these objects, and others which will become apparent below, one feature of this invention resides, briefly stated, in a camera support arrangement comprising a main support, such as a main or full size tripod, for supporting equipment to be adjustably positioned by a movable handle, and an auxiliary support, such as an auxiliary or miniature tripod having an auxiliary leg assembly with a plurality of legs movable between a closed position in which the legs are adjacent one another, and an open position in which the legs are spread apart.

In accordance with this feature of this invention, the handle is formed with a hollow interior, and the auxiliary tripod is at least partly received in, and removable from, the interior of the handle in either position of the auxiliary leg assembly. The auxiliary tripod is thus conveniently stored and jointly handled with the main tripod, and is readily accessible. The risk of not bringing, or forgetting to bring, the auxiliary tripod to a photographic site is minimized because the auxiliary tripod automatically is carried with and by the main tripod. The risk of loss of the auxiliary tripod is reduced because it has an assigned place.

Another feature of this invention relates to increasing the versatility of the main tripod. Typically, the main tripod has a central column extending along a vertical column axis, and the handle is operative for moving a piece of equipment supported on a head or platform of the tripod with two, or sometimes three, freedoms of movement relative to the column axis. A first freedom of movement is in either circumferential direction about the column axis in a generally horizontal plane. A second freedom of movement is in either circumferential direction about a horizontal tilt axis perpendicular to the column axis. A separate plate can position the equipment from horizontal to a vertical position to provide a third freedom of movement.

Typically, the auxiliary tripod has a head or platform which is mounted for swiveling movement with a ball and socket joint and represents another freedom of movement available for use. To employ this additionally available freedom of movement, this invention proposes positioning the head of the auxiliary tripod outside of the handle so that a camera can be mounted thereon even when the auxiliary tripod is mounted within the handle. Advantageously, the handle, which extends along a handle axis, is moved so that the handle axis is vertical and parallel to the column axis. In this position, a photographer can use the ball and socket joint and its available freedom of movement even though the main tripod, without the auxiliary tripod, did or may not have this additional freedom of movement available.

Versatility is further enhanced by mounting one camera on the head of the main tripod, and another camera on the head of the auxiliary tripod. Such simultaneous camera use is especially useful when using a film camera and a digital camera.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is an enlarged sectional view taken on line 2—2 of FIG. 1;

FIG. 3 is a perspective view of the auxiliary tripod in an open position for supporting a camera depicted in phantom lines;

FIG. 4 is a perspective view depicting joint use of the tripods; and

FIG. 5 is an enlarged sectional view taken on line 5—5 of FIG. 4.

DETAILED DESCRIPTION OF THE PREFERRED EMBODIMENTS

Figure 1:
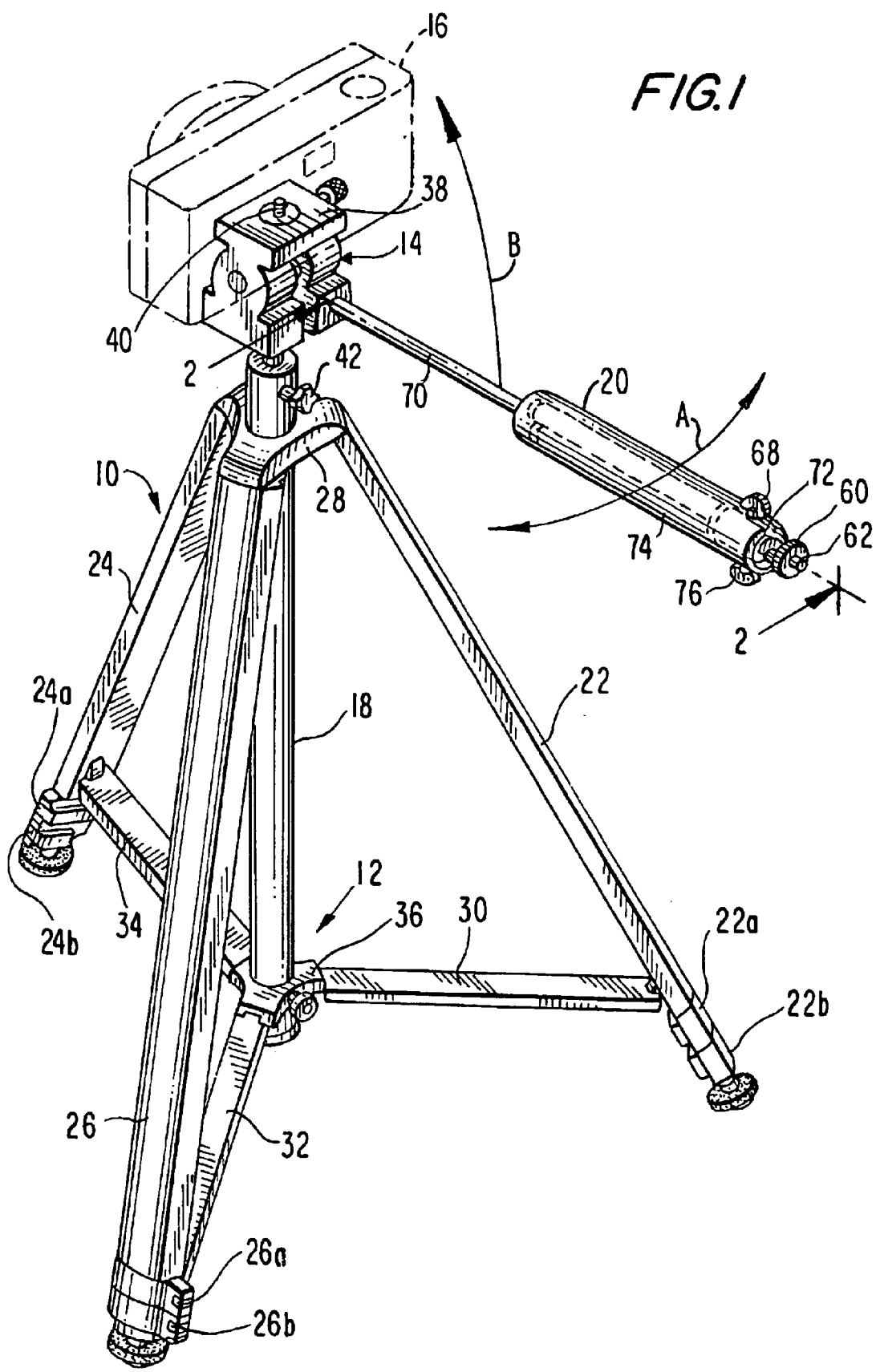
FIG. 1 is a perspective view of a main tripod for supporting a camera depicted in phantom lines, and equipped with a positioning handle in which an auxiliary tripod is mounted in accordance with this invention.

Reference numeral 10 identifies a full size or main tripod having a main leg assembly 12, a main head 14 mounted for movement relative to leg assembly 12, and a handle 20 connected to the head 14 for adjustably positioning a piece of equipment, such as a camera 16 shown in phantom lines.

The leg assembly 12 includes three legs 22, 24, 26 pivotably mounted at their respective upper ends to a stationary collar 28 that is fixed around a cental vertical column 18. Each leg is extendable by a plurality of telescoping leg sections which are locked in the desired extended position by leg locks 22a, b, 24a, b and 26a, b, one lock for each leg section. The legs in FIG. 1 are shown in the open, deployed position in which they are spread angularly apart. For increased stability, a plurality of leg links 30, 32, 34 have their outer ends pivotably connected to the legs, and their inner ends pivotably connected to a movable collar 36 that slides up and down the column 18 as the legs are moved between the illustrated open position and a closed position in which the legs are closely adjacent one another and surround the column 18.

The head 14 has a platform 38 on which the camera 16 rests. A mounting screw 40 is threaded into a threaded bore provided in the camera to secure the latter in place. The head 14 is mounted on a vertical elevator shaft that is raised and lowered within the column 18, and locked at a desired height by a lock 42. Preferably, the shaft has teeth engaged with a gear that is turnable by a crank, but this has not been shown in order to simplify the drawing.

The head 14 is movable by the handle 20 with a first freedom of movement in either circumferential direction, as depicted by the double-headed arrow A, in a horizontal plane about a vertical column axis along which the column 18 extends. The handle 20 also moves the head with a second freedom of movement in either circumferential direction, as depicted by the double-headed arrow B, in a vertical plane about a horizontal tilt axis perpendicular to the column axis. Thus, the handle can pan the camera from side to side, and can tilt or pitch the camera forward and backward.

As described so far, the main tripod 10 is entirely conventional. Also conventional is a miniature or auxiliary table-top tripod 50 depicted in FIG. 3. Tripod 50 also has a leg assembly with three legs 52, 54, 56 pivotably connected at their respective upper ends to a housing 58. Each leg is extendable by a telescoping leg section therein to an extended position held in place by friction. Legs 52, 54, 56 are depicted in their open position in FIG. 3 and, as will be explained below, in their closed position in FIG. 2.

Tripod 50 includes a head or platform 60 on which the camera 16 rests, and a mounting screw 62 which is threaded into a threaded socket on the camera. The opposite end of the mounting screw 62 terminates in a ball 64 (see FIG. 2) receivable in a spherical socket 66. The ball 64 swivels in the socket and is lockable in a desired position by a lock 68 which is essentially a thumbscrew that turns a cam to press the ball 64 against the socket and hold the ball in place until the thumbscrew is turned in an opposite direction.

Tripod 50 is useful for table-top or close-in applications where the main tripod is too big. For example, the length of each unextended leg of the main tripod is on the order of 22", whereas the length of each unextended leg of the auxiliary tripod is on the order of 4". As previously noted, the small size of the tripod 50 tends to promote its being misplaced.

In accordance with one feature of this invention, the handle 20 is modified to enable the tripod 50 to be at least partly received therein. Heretofore, the handle for the main tripod included a rod 70 having one end threaded into the head 14, and its opposite end threaded into a solid cylindrical part, sometimes overlain by a rubber sleeve for an improved grip and comfort. Now, this invention proposes forming a cylindrical part 74 with a hollow interior, and providing an open, outer axial end through which the tripod 50 (with its legs in the closed state) is inserted for a snug fit within the interior of the handle. The tripod 50 is inserted "feet-first". Upon full insertion, the platform 60 and the mounting screw 62 are located outside the handle interior. The cylindrical part 74 is formed with an axial clearance slot 72 so that the lock 68 does not block full entry of the tripod 50. Although friction can be relied on to hold the tripod 50 in place, a setscrew 76 is provided on the cylindrical part 74 to lock the tripod 50 in place.

The accommodation of the tripod 50 within the handle 20 of the main tripod 10 enables the tripod 50 to be always readily available, without having to carry it separately. A camera operator usually wants to minimize the number of things he or she carries. The tripod 50 is easily removable from the handle and can be used as a separate table-top style camera support.

Another feature of this invention resides in the exterior location of the platform 60 and the mounting screw 62 outside the cylindrical part 74 which, in effect, serve as a second camera head for mounting the camera 16, in addition to the platform 38 and the mounting screw 40 which serve as a first camera head.

As shown in FIG. 4, the handle 20 is moved up to a generally vertical position, that is, the axis of the handle is vertical and is parallel to the axis of the column 18. The camera 16 is then mounted on the second camera head.

It will be recalled that the head 14 of the main tripod 10 had two freedoms of movement in directions of arrows A and B. The head of the auxiliary tripod 50 has a ball and socket joint and thus represents a third freedom of swiveling movement. Hence, by mounting the camera on the second head 60, the camera operator gains another freedom of movement for increased versatility.

The hollow handle 20, with or without the tripod 50, can be offered as an accessory replacement for a solid handle on an existing tripod 10, or can be offered as an integral component of a purpose-built tripod.

Although illustrated as being useful for a camera 16 for taking still pictures, the dual-tripod arrangement described herein can be used to support other photographic equipment such as a video or digital camera, or binoculars, or a compass, or to support any piece of equipment requiring to be held stationary during use.

Although the use of the second head is described as being optimal when the handle 20 extends along a vertical axis, this is not strictly necessary since there are some main tripods where the handle cannot be so positioned.

It will be understood that each of the elements described above, or two or more together, also may find a useful application in other types of constructions differing from the types described above.

While the invention has been illustrated and described as embodied in a tripod handle arrangement, it is not intended to be limited to the details shown, since various modifications and structural changes may be made without departing in any way from the spirit of the present invention.

For example, the main support need not be a tripod having legs, but can be any support, such as a crane, dolly or studio stand, that is, a single vertical shaft with a flat round base, with attachment brackets on which a camera head is located. When the auxiliary tripod is not removed from the main support, a first camera, such as a larger film camera, may be mounted on the head of the main support, and a second camera, such as a smaller digital camera, may be mounted on the head of the auxiliary tripod. Similarly, the auxiliary support need not be a tripod having legs, but can be any support on which a camera is supportable.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A tripod arrangement, comprising:
   a) a main tripod including a movable handle having a hollow interior; and
   b) an auxiliary tripod including an auxiliary leg assembly having a plurality of legs movable between a closed position in which the legs are adjacent one another, and an open position in which the legs are spread apart, the auxiliary tripod being at least partly received in, and removable from, the interior of the handle.

2. The arrangement of claim 1, wherein each leg of the auxiliary leg assembly has a length, and wherein the main tripod includes a main leg assembly having a plurality of legs each having a length longer than the length of each leg of the auxiliary leg assembly.

3. The arrangement of claim 1, wherein the auxiliary tripod has an equipment platform located exteriorly of the handle.

4. A tripod arrangement, comprising:
   a) a first tripod including a first leg assembly, a first head mounted for movement relative to the first leg assembly, and a handle having a hollow interior and connected to the first head for moving the first head relative to the first leg assembly; and
   b) a second tripod including a second leg assembly and a second head mounted for movement relative to the second leg assembly, the second leg assembly having a plurality of legs movable between a closed position in which the legs are adjacent one another, and an open position in which the legs are spread apart, the second tripod being at least partly received within, and removable from, the interior of the handle.

5. The arrangement of claim 4, wherein the first leg assembly has a plurality of legs, each leg of the first leg assembly having a length longer than a length of each leg of the second leg assembly.

6. The arrangement of claim 4, wherein the first leg assembly has an upright column extending along a column axis, and wherein the handle is operative for moving the first head in either circumferential direction about the column axis, as well as in either circumferential direction about a transverse axis perpendicular to the column axis.

7. The arrangement of claim 4, wherein the first head has a first platform on which equipment is supported and held during movement of the first head by the handle.

8. The arrangement of claim 4, wherein the handle is elongated and has an open axial end through which the legs of the second leg assembly in the closed position are slidably inserted.

9. The arrangement of claim 4, wherein the second head has a second platform on which equipment is supported, and wherein the second platform is located exteriorly of the handle upon receipt of the second tripod in the handle.

10. The arrangement of claim 4, wherein the first leg assembly has an upright column extending along a column axis, and wherein the handle is elongated along a handle axis and movable to an upright position in which the handle axis is parallel to the column axis, and wherein the second head has a second platform on which equipment is supported, and wherein the second platform is located exteriorly of the handle upon receipt of the second tripod in the handle, and wherein the second platform is movable relative to the handle axis.

11. The arrangement of claim 10, wherein the second head has a ball and socket joint for enabling the second platform to swivel.

12. A handle assembly for a camera, comprising:
   a) a handle having a hollow cylindrical part and a rod that interconnects the hollow cylindrical part to a main head of a main camera tripod having a main leg assembly;
   b) an auxiliary camera tripod having an auxiliary head and an auxiliary leg assembly which has a plurality of legs movable between a closed position in which the legs are adjacent one another, and an open position in which the legs are spread apart, the legs of the auxiliary tripod being received in the hollow cylindrical part in the closed position, the auxiliary head being located exteriorly of the hollow cylindrical part in the closed position; and
   c) means for detachably connecting a camera to the main head, and for selectively detachably connecting the camera to the auxiliary head in the open position.

* * * * *